US010960424B2

(12) United States Patent
Le Strat et al.

(10) Patent No.: US 10,960,424 B2
(45) Date of Patent: Mar. 30, 2021

(54) METHOD FOR APPLYING A COATING PRODUCT TO A COMPONENT BEING MOVED BY A CONVEYOR, AND COATING PRODUCT APPLICATION INSTALLATION

(71) Applicant: EXEL INDUSTRIES, Epernay (FR)

(72) Inventors: Cédric Le Strat, Seyssinet Pariset (FR); Philippe Provenaz, Meylan (FR); Eric Prus, Grenoble (FR); Hervé Brochier-Cendre, Froges (FR)

(73) Assignee: EXEL INDUSTRIES, Epernay (FR)

( * ) Notice: Subject to any disclaimer, the term of this patent is extended or adjusted under 35 U.S.C. 154(b) by 421 days.

(21) Appl. No.: 15/550,679

(22) PCT Filed: Feb. 16, 2016

(86) PCT No.: PCT/EP2016/053227
§ 371 (c)(1),
(2) Date: Aug. 11, 2017

(87) PCT Pub. No.: WO2016/131805
PCT Pub. Date: Aug. 25, 2016

(65) Prior Publication Data
US 2018/0043385 A1    Feb. 15, 2018

(30) Foreign Application Priority Data
Feb. 17, 2015   (FR) ...................................... 1551330

(51) Int. Cl.
*B05B 12/12*      (2006.01)
*B05B 16/00*      (2018.01)
(Continued)

(52) U.S. Cl.
CPC ............ *B05B 12/122* (2013.01); *B05B 12/04* (2013.01); *B05B 13/0457* (2013.01);
(Continued)

(58) Field of Classification Search
CPC .................................................. B05B 12/122
See application file for complete search history.

(56) References Cited

U.S. PATENT DOCUMENTS 3,777,702 A      12/1973   Fitzgerald
4,357,900 A *    11/1982   Buschor .............. B05B 13/0264
                                                        118/681
(Continued)

FOREIGN PATENT DOCUMENTS

CN      1129613 A      8/1996
CN      1242262 A      1/2000
(Continued)

OTHER PUBLICATIONS

International Search Report issued for PCT/EP2016/053227, dated May 11, 2016, 5 pages.

*Primary Examiner* — Nathan T Leong
(74) *Attorney, Agent, or Firm* — Duane Morris LLP

(57) ABSTRACT

This method allows a coating product to be applied to a component (13) being moved by a conveyor (12), along which conveyor at least one spray (62.1, 62.2) is arranged. It comprises automated steps involving determining, within a fixed frame of reference (X12, Y12, Z12), the coordinates of the points (A1, B1, C1, A2, B2, C2) of one or more lines (L1, L2) of the exterior profile of the component which are distributed along the length of the component, in assigning to each spray the points of each exterior profile line that lie within its field of spraying, in identifying, from among the points assigned to each spray, the point (A1, A2; B1, B2) closest to the spray for each exterior profile line, in determining, for each spray, a line (L3, L4) to follow that passes through all the points (A1, A2, B1, B2) closest to the spray as identified in step c), and in establishing a reference path for each spray according to the points on the line (L3, L4) to follow so that the application distance of each spray is (Continued)

adjusted automatically and independently according to the exterior profile of the component.

10 Claims, 5 Drawing Sheets

(51) Int. Cl.
    *B05B 12/04*      (2006.01)
    *B05B 13/04*      (2006.01)
    *G05B 19/19*      (2006.01)
    *G06F 8/61*      (2018.01)
    *B05D 1/02*      (2006.01)
    *B05B 5/08*      (2006.01)

(52) U.S. Cl.
    CPC ............... *B05B 16/90* (2018.02); *B05D 1/02* (2013.01); *G05B 19/19* (2013.01); *G06F 8/61* (2013.01); *B05B 5/082* (2013.01); *B05B 5/084* (2013.01); *G05B 2219/45013* (2013.01)

(56) References Cited

U.S. PATENT DOCUMENTS

| | | |
|---|---|---|
| 4,639,878 A | 1/1987 | Day et al. |
| 5,298,277 A | 3/1994 | Hirose |
| 5,718,767 A | 2/1998 | Crum et al. |
| 6,096,132 A | 8/2000 | Kaiba et al. |
| 2002/0046698 A1 | 4/2002 | Congard et al. |
| 2007/0169691 A1 | 7/2007 | Rodrigues et al. |

FOREIGN PATENT DOCUMENTS

| | | |
|---|---|---|
| CN | 1469781 A | 1/2004 |
| CN | 201120331 Y | 9/2008 |
| CN | 101947505 A | 1/2011 |
| EP | 0529851 A1 | 3/1993 |
| EP | 0706102 A2 | 4/1996 |
| EP | 0970811 A1 | 1/2000 |
| EP | 2712680 A1 | 4/2014 |
| FR | 2855081 A1 | 11/2004 |
| IT | MI20091474 A1 | 2/2011 |
| JP | 981158168 A | 12/1981 |
| JP | 987054115 A | 3/1987 |
| JP | 1999165121 A | 6/1999 |
| JP | 2006528065 A | 12/2006 |
| WO | 02/00449 A1 | 1/2002 |
| WO | 2013/175392 A1 | 11/2013 |
| WO | WO2013175392 | * 11/2013 |

* cited by examiner

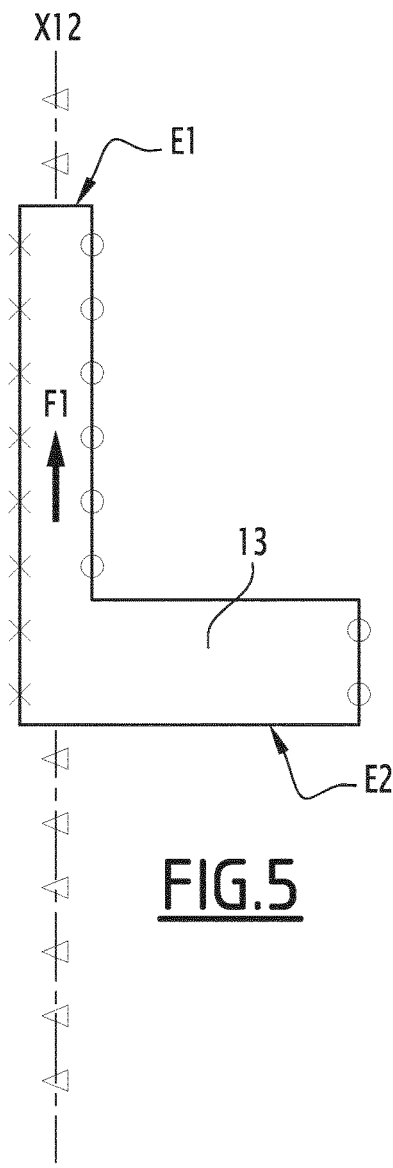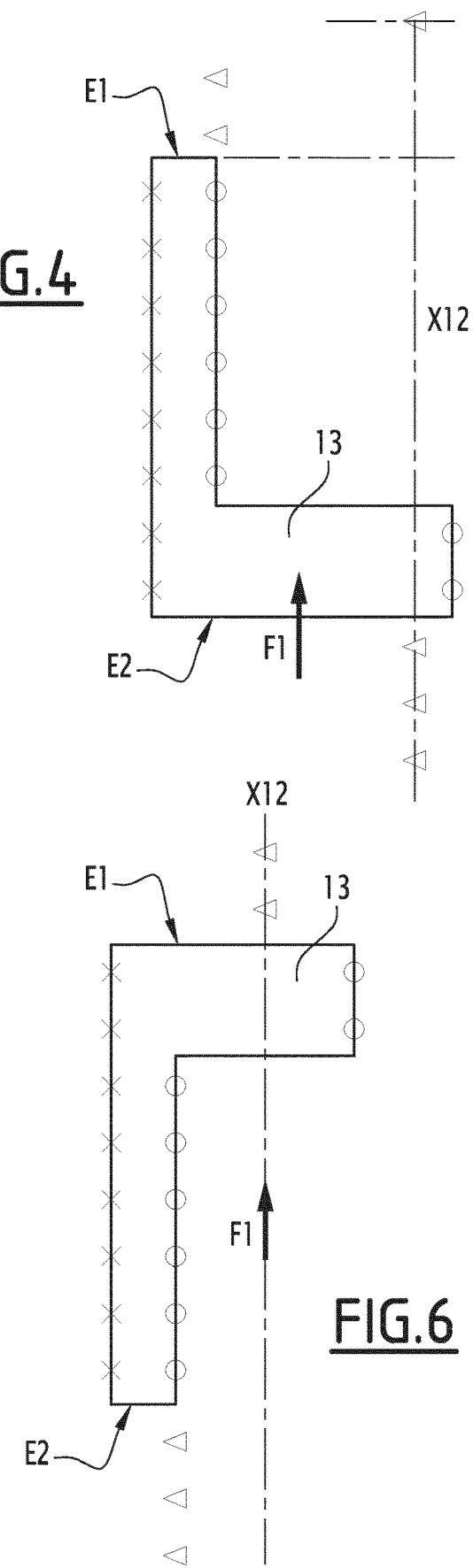

METHOD FOR APPLYING A COATING PRODUCT TO A COMPONENT BEING MOVED BY A CONVEYOR, AND COATING PRODUCT APPLICATION INSTALLATION

CROSS-REFERENCE TO RELATED APPLICATIONS

The present application is a United States national stage application under 35 U.S.C. § 371 of international patent application number PCT/EP2016/053227, filed Feb. 16, 2016, which claims priority to French patent application no. 1551330, filed Feb. 17, 2015, the entireties of which are incorporated herein by reference.

The present invention relates to a coating application method for applying a coating product to a component piece being moved by a conveyor, and coating application installation for applying a coating product with which this method can be implemented.

In a known manner, EP-A-0706102 discloses a spraying installation for spraying a coating product comprising a conveyor on which are suspended one or more component pieces to be sprayed and sprayers which are arranged along the conveyor. The installation also comprises a component detection system for detecting component pieces within the field of application of the sprayers. The sprayers are automatically controlled so as to sprayer the coating product only if the presence of a component piece is detected within their field of application. This installation has the disadvantage that the application distance of the sprayers is not adjusted based on the dimensions of the component pieces conveyed.

The document FR-A-2855081 addresses this technical problem and discloses an installation comprising a first imprecise sprayer column, which does not take into account the geometry of the component piece. This first column is provided with a reciprocator robot having a plurality of sprayers that are movable vertically in a block. This first column not providing for the possibility to apply a coat (thickness) of paint or homogeneous powder over the entire component piece, the installation also comprises a second column, referred to as re-touchup or pre-touchup column, depending on whether the latter is disposed respectively downstream or upstream of the first column. This second column serves the function of applying the product on difficult areas of the component piece in order to improve the quality of the finish. It is equipped with several carriages supporting the paint application guns. These carriages are movable independently of each other along a vertical direction and along a horizontal direction perpendicular to an axis of movement of the conveyor. An oblong opening extending in the direction of the height is made in the cell for the passage of the guns. The component pieces that enter into the cell each have a predetermined profile, which is entered and saved in a table and stored in the memory in a control unit. In particular, the length, the width, and the depth of the component piece, that is to say all of the dimensional measurements of each component piece are known. The guns of the second column are then positioned based on the pre-stored dimensional measurements in order to obtain a correct application distance in their respective fields of application.

Furthermore, the document EP-A-2712680 discloses a coating application method for applying a coating product that includes a preliminary detection step for detecting the dimensional measurements of a component piece to be coated. As explained in the paragraph [0052], this method is effectively implemented on component pieces whose profile is pre-recorded in a table. In the example represented in the figures, these component pieces are generally selected to have overall rectangular forms and may include one or more recesses on the front side and/or on the rear side. The width of a component piece to be coated is determined by an incremental encoder. The depth and the width of the one or more possible recesses formed in the component piece are determined by means of an optical scanning device, formed by two sensors arranged on either side of the component piece. Each component piece is classified in the table according to the dimensional measurements thereof. For example, if the width is comprised between 0% and 25% of a nominal value, the component piece will be classified in a certain category. Based on their classification in the table, specific parameters are assigned to the sprayers arranged along the conveyor. In particular, these parameters include, inter alia, the application distance, that is to say the distance between the surface to be painted and the sprayer.

The two methods provided in the documents FR-A-2 855081 and EP-A-2 712680 do not take into account any eventual defects related to the attachment of the component pieces on the conveyor. In addition, they apply only to the component pieces whose profile is pre-recorded and stored in the memory, that is to say that they do not apply to component pieces having freeform shapes of any kind.

More particularly, it is these drawbacks that the invention is intended to remedy by providing a coating application method for applying a coating product which makes it possible to adjust automatically and independently the application distance of each sprayer, in order to be adapted to component pieces having freeform shapes or pieces that are poorly attached or held in place, and with this occurring progressively as the component pieces moves forward along the conveyor. As a consequence thereof a correct application distance and a good quality finish are thus obtained.

To this end, the invention concerns a coating application method for applying a coating product on a component piece moved by a conveyor, along which is arranged at least one sprayer that is movable in a plane that is oblique or perpendicular to an axis of movement of the conveyor. This method includes at least one of the following automated steps consisting of:

a) determining in a fixed coordinate system, the coordinates of the points of one or more exterior profile lines of the component piece distributed over the length of the component piece;

b) assigning to each sprayer the points of each exterior profile line that are found to be in its spraying field (range);

c) among the points assigned to each sprayer, identifying for each exterior profile line the point that is nearest to the sprayer;

d) determining for each sprayer, a tracking line that passes through the orthogonal projection of all the nearest points identified in the step c) in a plane passing through an axis of the sprayer and parallel to the axis of movement of the conveyor; and e) establishing a set point trajectory for each sprayer on the basis of the points of the tracking line in a manner so as to adjust automatically and independently the application distance of each sprayer according to the exterior profile of the component piece.

Thanks to the invention, a set point trajectory is established for each sprayer based on the dimensions of the component piece conveyed. The dimensions of the component piece conveyed is determined by calculating, in a fixed coordinate system, the coordinates of the points of a plurality of exterior profile lines of the component piece to be coated distributed over the length of the component piece. Each exterior profile line is segmented into multiple sections, each corresponding to the points of the exterior profile line that belong within the field of application of a sprayer. After having identified the point of each section which is nearest to the sprayer, it is possible to establish a tracking line that passes through the points that are nearest to the sprayer, on the basis of which a set point trajectory is assigned to the corresponding sprayer. This method thus takes into account the component pieces having freeform shapes or that are poorly attached to the conveyor.

According to aspects of the invention that are advantageous but not mandatory, such a coating application method for applying a coating product may incorporate one or more of the following characteristic features, taken into consideration in accordance with any technically feasible combination:

- The method includes a further step consisting of measuring the position of each component piece along the conveyor, whereas the step a) consists in determining the coordinates of the points of a plurality of exterior profile lines distributed at regular intervals over the length of the component piece.
- The method includes a further step consisting of controlling each sprayer in order for spraying the coating product only if the component piece is found to be in its spraying field.
- Each tracking line is extended digitally on either side by fictitious measurement points for spraying the product on the front surface and rear surfaces of the component piece.
- The fictitious measurement points are positioned on the axis of the conveyor if the front surface or rear surface is intersected by the axis of the conveyor and are positioned axially in the extension of (in line with) the first or last point of the tracking line if the front or rear surface is not intersected by the axis of the conveyor.
- The fictitious measurement points are distributed over a segment that is parallel to the axis of the conveyor, whose length is equal to the width of the spraying field of the sprayer.
- The step e) comprises the sub-steps consisting of:
  f) assigning a displacement curve in the shape of a semi-ellipse to each point of the tracking lines, the nominal application distance of the sprayer corresponding to half the major axis of the displacement curve;
  g) determining the set point trajectory by establishing an envelope-surface line of the point cloud formed by the points of each displacement curve assigned in the step f).
- The method includes a further step consisting of: checking to verify whether each sprayer is capable of following its trajectory; and if it is not capable thereof, establishing a new trajectory, which best follows the set point trajectory, or moving back to the maximum extent the sprayer in order to avoid a collision between the component piece to be coated and the sprayer.
- At least one of the sprayers is capable of performing a combined vertical and horizontal movement in its displacement plane, while the point that is nearest to the sprayer within its field of application is updated over the course of the vertical movement of the sprayer and the application distance of the sprayer is automatically adjusted based on the coordinates of the nearest point.
- A calculation step for calculating the trajectory of the sprayers that are capable of performing a combined movement comprises sub-steps consisting of:
  m) digitally extending an exterior profile surface, formed by all the exterior profile lines, by fictitious measurement points on both sides in the lengthwise direction;
  n) assigning a displacement curve in the shape of a semi-ellipse to each real measurement point belonging to the exterior profile lines and to each fictitious measurement point, the nominal application distance of the sprayer corresponding to half the major axis of the displacement curve;
  p) determining a peripheral envelope surface of the point cloud formed by the points of each displacement curve assigned in the step n); and
  q) establishing a set point trajectory within the interior of this peripheral envelope surface.
- In the step a), each exterior profile line is formed by straight line segments joining different real measurement points and characterised in that, in the step b), one or more exterior profile lines are supplemented by one or two of artificial measurement points at the intersection between the straight line segments and the lower and/or upper limits of the spraying field of each sprayer.

The invention also relates to a coating application installation for applying a coating product on a component piece moved by a conveyor, along which is arranged at least one sprayer, that is movable in a plane that is oblique or perpendicular to an axis of movement of the conveyor. This installation comprises at least one of the following means:

- a first means for determining in a fixed coordinate system, the coordinates of the points of one or more exterior profile lines of the component piece, distributed over the length of the component piece;
- a second means for assigning to each sprayer, the points of each exterior profile line which are in its spraying field;
- a third means for identifying, for each exterior profile line and among the points assigned to each sprayer, the point that is nearest to the sprayer;
- a fourth means for determining for each sprayer, a tracking line that passes through the orthogonal projection of all the nearest points in a plane passing through an axis of the sprayer and parallel to the axis of movement of the conveyor; and
- a fifth means for establishing a set point trajectory for each sprayer on the basis of the points of the tracking line in a manner so as to adjust automatically and independently the application distance of each sprayer according to the exterior profile of the component piece.

According to aspects of the invention that are advantageous but not mandatory, such a coating application installation for applying a coating product according to the invention may incorporate one or more of the following characteristic features, taken into consideration in accordance with any technically feasible combination:

- The installation comprises a column of sprayers, arranged on one side of the conveyor.
- The first means includes a sensor, disposed on one side of the conveyor, upstream of the one or more sprayers.
- The installation comprises at least two columns of sprayers, which are arranged on either side of the conveyor, these columns being preferably arranged in pairs, while the columns of sprayers of each pair are arranged side-by-side.

The first means includes two sensors, which are arranged on either side of the conveyor, upstream of the one or more sprayers and which each have a vertical measurement plane.

The sensors are offset in relation to one another along the axis of movement of the conveyor.

The sensors are laser radars, generating a laser beam that scans the height of the component piece.

Two mirrors are arranged above and below each sensor, these mirrors being oriented so as to reflect the laser beams of the sensor so as to reach the shaded areas of a component piece to be coated.

The invention and other advantages thereof will become more clearly apparent in the light of the description that follows of two embodiments of a coating application method for applying a coating product in accordance with the principle thereof, provided solely by way of example and with reference made to the accompanying drawings in which:

FIGS. 4 to 6 are diagrams illustrating, in a top view, various configurations for attachment of a component piece on to a conveyor;

Figure 1:
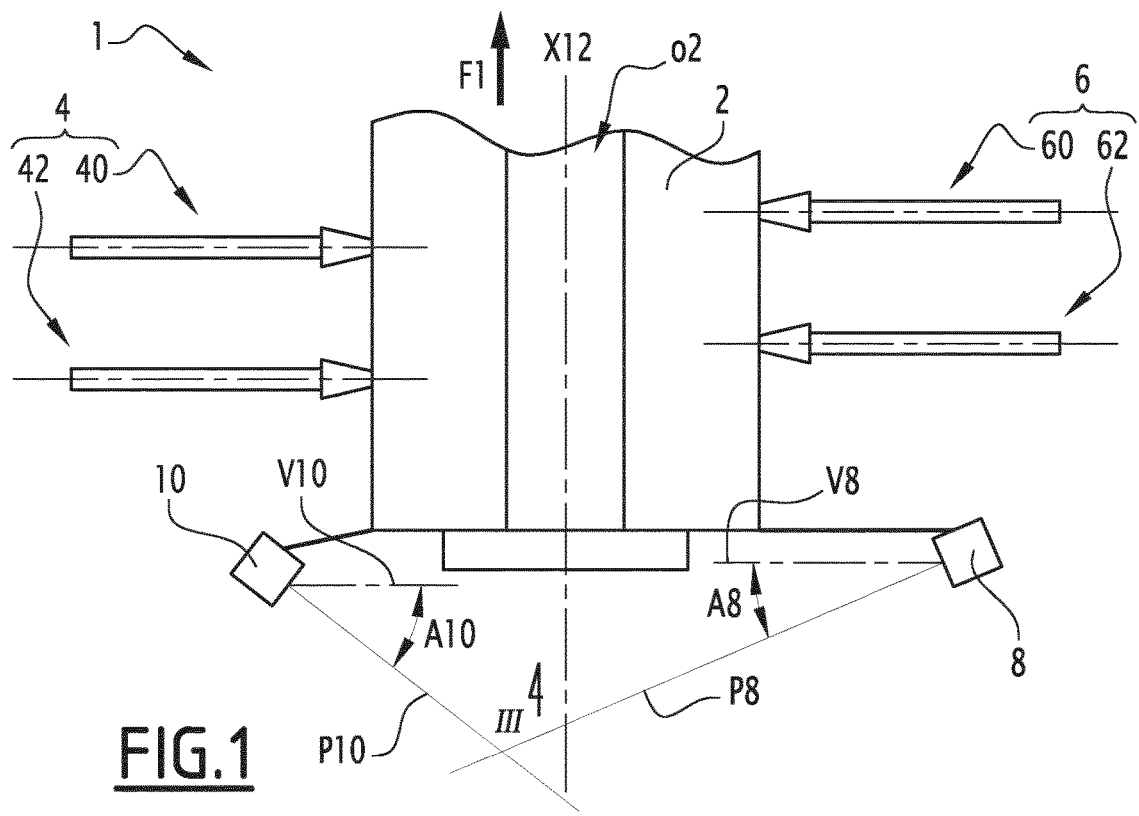
FIG. 1 is a view from top of a coating application installation for applying a coating product according to the invention.
Figure 2:
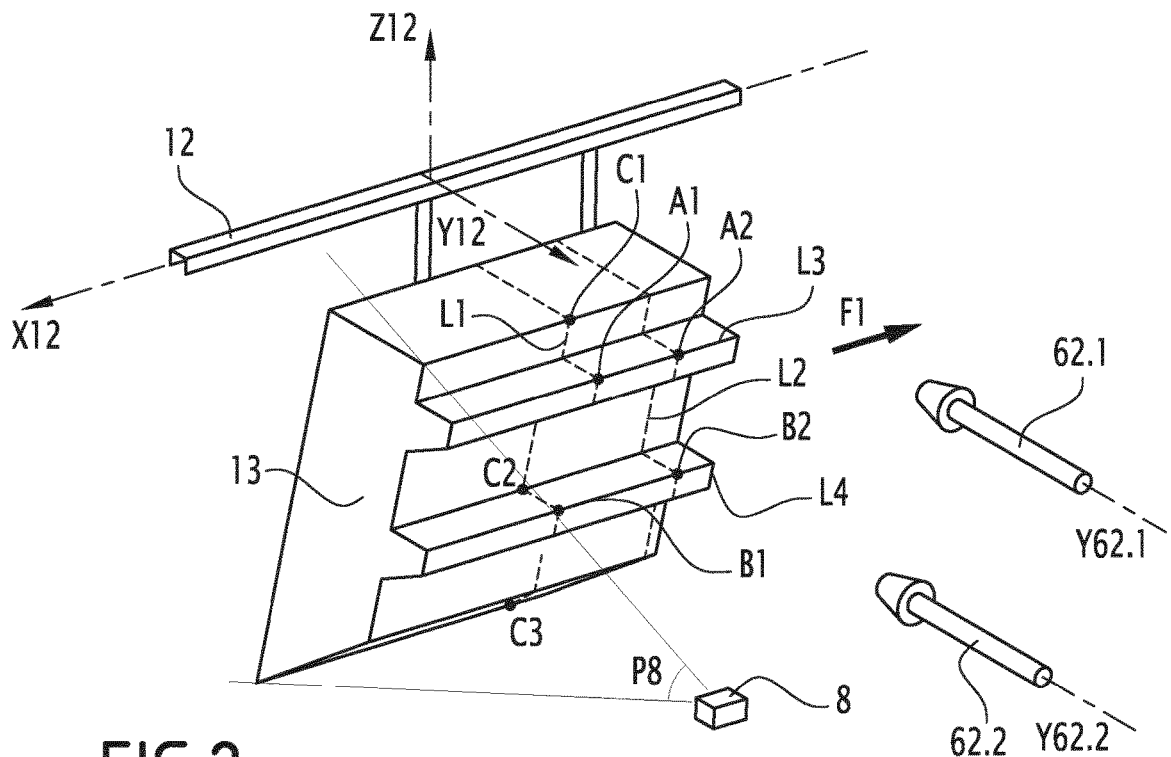
FIG. 2 is a perspective view of a component piece moved by a conveyor belonging to the installation represented in FIG. 1.

FIG. 1 shows a coating application installation 1 for applying a coating product. The installation 1 is configured in order to apply the product on to the component pieces moved by a conveyor 12. As can be seen in FIG. 2, the conveyor 12 is an overhead conveyor on which are suspended one or more component pieces 13 to be coated. X12 denotes an axis of movement of the conveyor 12 and F1 denotes the direction of movement of the conveyor 12.

In the following sections of the description, a longitudinal direction, that is to say going along the direction of the length of a component piece, is parallel to the axis X12.

The installation 1 comprises a cell 2 delimiting in the upper part a longitudinal opening o2 for the through-passage of the conveyor 12. The cell 2 is provided with several lateral openings that are not represented for the through-passage of the sprayers.

In this present document, the term "sprayer" is to be interpreted in a broad sense. Indeed, in the example represented in the figures, the sprayers are sprayers for liquid paint, but the invention is also applicable, among others, to powder sprayers. Thus, the coating product may be paint, a varnish or even a primer, in the form of liquid or powder.

In the example, two pairs 4 and 6 of vertical rows of sprayers are arranged on each side of the cell 2. The sprayers arranged on the side of the pair 4 are "left" sprayers, while the sprayers arranged to be opposite thereto, on the side of the pair 6 are "right" sprayers.

The pair 4 comprises of two columns 40 and 42 of sprayers, each column including eight sprayers evenly distributed in a regular manner in the height-wise direction. Similarly, the opposite pair 6 comprises of two vertical columns of sprayers 60 and 62, each row including eight sprayers distributed in height with a regular interval. The two columns of sprayers 40 and 42, as well as the two columns 60 and 62 are arranged side by side. The eight sprayers of the column 42 are numbered 42.1 to 42.8 in order going from the highest sprayer to the lowest sprayer. In similar fashion, the eight sprayers of the opposite column 62 are numbered 62.1 to 62.8 in order from the highest sprayer to the lowest sprayer.

The sprayers of the columns 40 and 42 as well as the sprayers of the columns 60 and 62 are not arranged to be facing each other in the same horizontal plane in a manner so as to minimise the interference during the spraying. This is particularly significant when the coating product is electrostatically charged.

Each sprayer defines a spraying axis along which the product is sprayed. In the example shown in the figures, the spraying axis of each sprayer is horizontal and perpendicular to the axis of movement X12 of the conveyor 12. In FIG. 2, the spraying axes of the sprayers 62.1 and 62.2 are denoted with the references Y62.1 and Y62.2. More generally, Y62.$i$ denotes the spraying axis of a sprayer 62.$i$, with i comprised between 1 and 8.

Each sprayer is movable in a plane that is perpendicular to the axis of movement X12 of the conveyor 12, in particular along its axis. Indeed, each sprayer is mounted on a movable carriage that is not represented, which is capable of sliding in a rail that is also not shown. The carriage can for example be set in translational motion by an electric motor. Each movable carriage is controlled in movement by an electronic control unit that is not represented.

Two sensors 8 and 10 are disposed upstream and on the exterior of the sprayer cell 2. These two sensors 8 and 10 are disposed on either side of the conveyor 12, respectively on the right and on the left, and are provided in order for measuring the dimensions of the component pieces entering the cell 2. The sensors 8 and 10 are laser sensors, known as "radar laser", "scanner laser", or even "lidar". They function by means of scanning, that is to say, that they generate a laser beam which moves in a vertical plane, respectively denoted with the references P8 or P10, over an angle of approximately 270°. These laser sensors make it possible to measure the distance between a point of the object targeted by the laser beam and the sensor. Thus, these sensors provide the ability to determine the coordinates, in a fixed coordinate system, of a series of points belonging to the intersection of the plane of the sensor and a component piece 13 to be coated. This series of points form an exterior profile line of the component piece 13. This exterior profile line is then contained in a vertical plane. As the component piece 13 is moved along the axis X12 of the conveyor 12, each sensor measures in practice several exterior profile lines, which are distributed over the length of the component piece with a regular interval. This interval depends on the speed of the conveyor 12, on the scanning frequency of the sensor 8 or 10 and on the angle of inclination of the measurement plane of the sensor relative to a vertical plane that is perpendicular to the axis X12.

In the example, the planes P8 and P10 are respectively inclined at an angle A8 and A10 in relation to a vertical plane V8 or V10 that is perpendicular to the axis of movement X12 of the conveyor 12. As a general rule, the wall thickness measured by a sensor is ever finer given that its measurement plane is inclined at a significant angle relative to a plane that is perpendicular to the axis X12.

The sensors 8 and 10 are offset in relation to one another along the axis X12 so as to be capable of deducing the speed of the conveyor 12. The speed of the conveyor 12 can also be measured directly by an appropriate sensor, that is not represented in the Figures.

Figure 3:
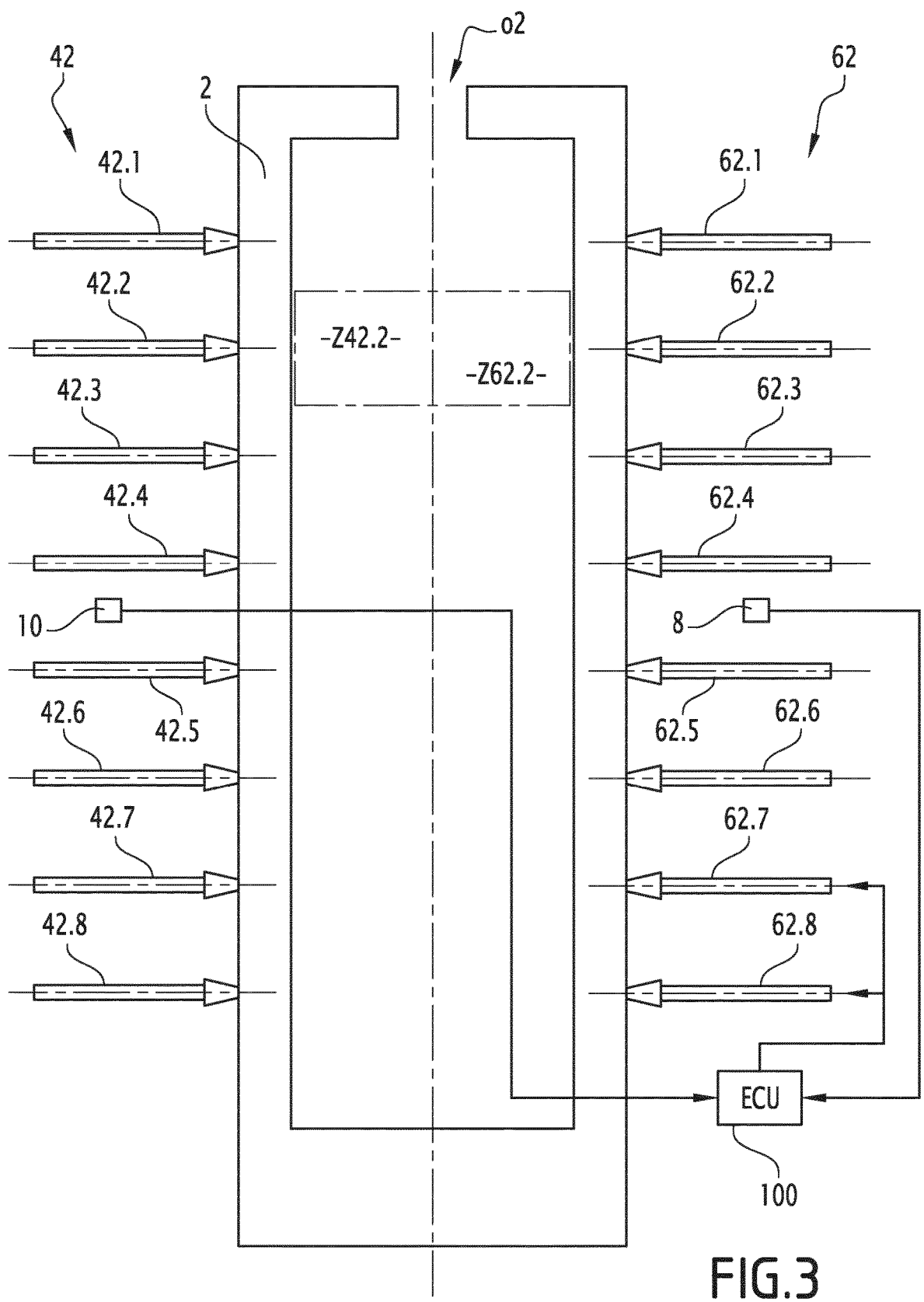
FIG. 3 is a view from front of the entrance of a cell belonging to the installation represented in FIG. 1, in the direction of the arrow III in FIG. 1.

As is visible in FIG. 3, the sensors 8 and 10 are positioned at mid-height relative to the height of the cell 2 in order to minimise the shaded areas, that is to say the areas which are inaccessible for the laser beam of the sensor because of the geometry of the component piece. These shaded areas are in fact the areas that are masked by the component piece itself.

The installation 1 also comprises an electronic control unit (ECU) 100, which is schematically represented in FIG. 3. The ECU 100 is configured in order to receive the measurement signals originating from the sensors 8 and 10. These signals include in particular the coordinates of the points of each exterior profile line in the fixed coordinate system. For the sake of clarity of the drawing, the ECU 100 is connected only to two sprayers in FIG. 3, respectively 62.7 and 62.8. However, the ECU 100 controls each sprayer of the columns of sprayers 40, 42, 60 and 62, that is to say, it is capable of sending set point signals to each sprayer. These set point signals correspond to the values of movement to be effected for each sprayer in order to reach a certain position along its axis.

Furthermore, each sprayer has a field of application, or a field of application, which corresponds to a zone in which it is capable of spraying the coating product. This zone generally corresponds to an overall parallelepiped volume. In FIG. 3 are shown the fields of application Z42.2 and Z62.2, respectively for the sprayers 42.2 and 62.2. The sprayers of the columns 42 and 62 are arranged to be facing each other. Thus, the zones Z42.2 and Z62.2 are combined.

Described here below is a coating application method for applying a coating product by means of the spraying installation 1. This method includes several automated steps, including therein a first step consisting of evaluating the dimensions of each component piece 13 entering into the cell 2. In order to do this, the sensors 8 and 10 determine one or more exterior profile lines on each side of the component piece, that is to say to the left and to the right of the conveyor 12. Thus, a complete exterior contour of the component piece is obtained. When the component piece moves forward along the axis X12 of the conveyor 12, the exterior contour of the component piece, which is measured by the sensors 8 and 10, may vary. This variation in dimensions is detectable by the sensors 8 and 10 because each of the latter measures the coordinates of the points of the exterior profile line that is contained within the measurement plane thereof, P8 or P10, and this occurs at every time instant. This first step thus consists of determining the coordinates, in a fixed coordinate system, of the points of one or more exterior profile lines distributed at regular intervals over the length of the component piece 13. The number of exterior profile lines depends on the frequency of the sensor 8 or 10, on the speed at which the conveyor 12 is moving forward, and on the length of the component piece. Here, the fixed coordinate system is a Cartesian coordinate system formed by the axis of movement of the conveyor X12, a horizontal axis Y12 which is perpendicular thereto and a vertical axis Z12.

In the example shown in FIG. 2, the component piece conveyed 13 is a truck tipper body. This truck tipper body 13 is poorly attached on the conveyor 12, in a manner such that it is inclined by about 10° relative to a vertical plane. In particular, the two methods described in the documents FR-A-2 855081 and EP-A-2 712680 would not provide the means to obtain a correct application distance in this configuration.

In this figure, two exterior profile lines L1 and L2 are represented. The truck tipper body is represented only partially in FIG. 2 for the purposes of clarity of the drawing.

Then, each exterior profile line is divided into multiple sections, based on the arrangement of the sprayers. Indeed, the position of the sprayers on a vertical axis, as well as the width of their field of application, or spraying field, is known. It is therefore possible to determine the specific sprayer within whose field of application each point of an exterior profile line is found. The points located in the same field of application are thus grouped together and together form a section of the exterior profile line. Each section of the exterior profile line is assigned to a sprayer. This assignment step is performed by the ECU 100.

For example, in the case of the exterior profile line L1 in FIG. 2, a first section delimited between the points C1 and C2 is assigned to the sprayer 62.1, while a section delimited between the point C2 and C3 is assigned to the sprayer 62.2 disposed below.

Subsequently, the method includes a step consisting of, among the points assigned to each sprayer, identifying the point which it is the nearest thereto. This step is performed by calculating the distance, parallel to the axis Y12, between each point assigned and the sprayer. Only the coordinate of the points of the profile line along the axis Y12 is therefore taken into account. This calculation step is also carried out by the ECU 100.

In the example of FIG. 2, the point nearest to the sprayer $62.i$, for i comprised between 1 and 8, corresponds to the point having the coordinate along the largest axis Y12. This is the point A1 for the sprayer 62.1 and the point B1 for the sprayer 62.2. The same operation is performed for each exterior profile line of the component piece. Thus, the point A2 of the line L2 is the point nearest to the sprayer 62.1 and the point B2 of the line L2 the point nearest to the sprayer 62.2.

Each section of each exterior profile line thus includes a point identified as being the nearest to the corresponding sprayer. It is therefore possible to determine, for each sprayer, a line passing through the nearest point of each exterior profile line. In the example shown in FIG. 2, the nearest points A1 and A2 or B1 and B2 are situated at the same altitude. However, in order to take into consideration the case where the nearest points are situated at different altitudes, each point identified as being the nearest is projected orthogonally in a horizontal plane containing the axis of the sprayer concerned and parallelly to the axis of the conveyor X12. A tracking line is assigned to each sprayer. This tracking line passes through the orthogonal projection of the point identified as being the nearest to the sprayer of each exterior profile line. The tracking lines are thus each contained within a horizontal plane. They thus extend in the direction of the length of the component piece to be coated, unlike the exterior profile lines which extend in the heightwise direction.

In the case of the truck tipper body illustrated in FIG. 2, a tracking line L3 passing through the points A1 and A2 is assigned to the sprayer 62.1, while a tracking line L4 that passes through the point B1 and B2 is assigned to the sprayer 62.2. The tracking lines assigned to each sprayer makes it possible to automatically programme a trajectory to be followed for each sprayer when the component piece 13 is moved along the conveyor 12. The trajectory to be followed for each sprayer is programmed by the ECU 100 in order to ensure that the latter retains a correct application distance progressively as the component piece 13 advances forward on the conveyor.

The tracking line of each sprayer is then supplemented by the "fictitious" measurement points that make it possible to coat the axial end surfaces of the component pieces, that is to say, the surfaces which are generally perpendicular to the axis of the conveyor 12. These fictitious measurement points extend each tracking line on either side of the component piece 13. These are points that are treated by the sprayers as real measurement points, even though they do not belong to any component piece. However, these fictitious measurement points are considered by the sprayers as belonging to the component piece. They are positioned in different ways based on the different cases.

In FIGS. 4 to 6, a component piece 13 attached to the conveyor 12 is considered, represented in a view from top. In addition, in FIGS. 4 to 6 and 8, the fictitious measurement points are represented by triangles, while the real measurement points measured by the sensors 8 and 10 are respectively represented by circles and crosses. The circles correspond to real measurement points assigned to a right sprayer, while the crosses correspond to real measurement points assigned to a left spray.

The front, or upstream, refers to a direction proceeding in the direction of the conveyor 12 that is to say in the direction of the arrow F1, while the rear, or downstream, refers to a direction opposite to the direction of movement F1 of the conveyor 12.

In the configuration of FIG. 4, the component piece 13 is attached in a manner such that its rear end surface E2 is intersected by the axis of the conveyor X12. The fictitious measurement points are added downstream of the real measurement points in order to coat the rear end surface E2 in the best possible manner. These fictitious measurement points are each arranged on the axis of the conveyor X12. They extend the tracking line backwards. The fictitious measurement points are also added upstream of the real measurement points in order to coat the front end surface E1 in the best possible manner. The front end surface E1 is not intersected by the axis of the conveyor X12. Thus, the downstream fictitious measurement points are each arranged in the axial extension of real measurement points, that is to say the circles in the example. In the example, only the tracking line of the right sprayer is supplemented by fictitious measurement points. However, the fictitious measurement points could also be added to the tracking line of the left sprayer.

In the configuration of FIG. 5, the component piece 13 is attached in a manner such that the end surfaces E1 and E2 are each intersected by the axis of the conveyor X12, the fictitious measurement points which extend the tracking line assigned to the right and/or left sprayer are thus all arranged on the axis of the conveyor X12.

In the configuration shown in FIG. 6, the rear end surface E2 is eccentric relative to the axis of the conveyor X12, while the front end surface E1 is intersected by the axis of the conveyor X12. The fictitious measurement points added upstream of the tracking line are positioned on the axis of the conveyor X12, while the fictitious measurement points supplementing the tracking line downstream are arranged in the extension of (in line with) the real measurement points. This allows for spraying the coating product in the most effective manner on the end surfaces E1 and E2.

The fictitious measurement points are therefore positioned on the axis of the conveyor X12 when the front surface E1 or rear surface E2 is intersected by the axis of the conveyor and are positioned axially in the extension of (in line with) the first or the last real measurement point of the tracking line if the front surface E1 or rear surface E2 is offset in relation to the axis of the conveyor X12, that is to say when this surface is not intersected by the axis of the conveyor. These fictitious measurement points are distributed on a segment that is parallel to the axis of the conveyor X12, whose length is equal to the width of the field of application of the sprayer. They are digitally added to each tracking line by the ECU 100.

Figure 7:
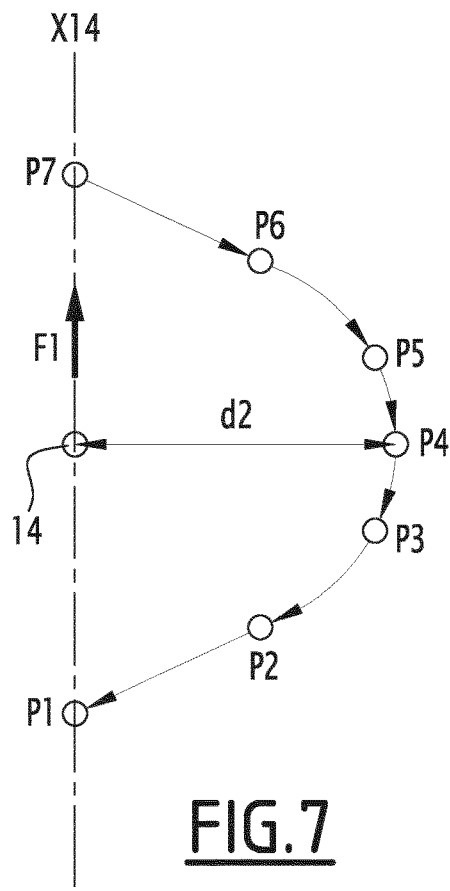
FIG. 7 represents the path of a sprayer of the installation represented in FIG. 1, along the spraying axis thereof, in relation to a measurement point belonging to a component piece.

Represented in FIG. 7 is the path of a sprayer seen from a mobile frame of reference and in a top view, in particular from a mobile frame of reference associated with a component piece being conveyed. In order to ensure clarity of explanation, the example chosen here is a measurement point 14 moving along an axis X14 that is parallel to the axis of the conveyor X12. As is visible in this figure, the trajectory of the sprayer in a horizontal plane is in the shape of a semi-ellipse and passes through points P1 to P7, which correspond successively to the positions of the sprayer along its axis during the displacement of the point 14. This semi-ellipse is centered on the measurement point 14. When there is no component piece in the field of application of the sprayer, this latter is positioned as if it should have to spray onto a point disposed on the axis of the conveyor X12. When the component piece arrives within the field of application of the sprayer, this latter moves backwards, and then moves forward when the component piece exits from the spraying field thereof, such that it describes a trajectory in the shape of a semi-ellipse. The sprayer then returns to the starting position, in which it is positioned as if it were sprayed onto a point disposed on the axis of the conveyor X12. The point P4 corresponds to the point where the sprayer is positioned to be facing the measurement point 14. The distance d2 that separates the point P4 from the point 14, that is to say half the major axis of the ellipse corresponds to the nominal application distance of the sprayer.

Figure 8:
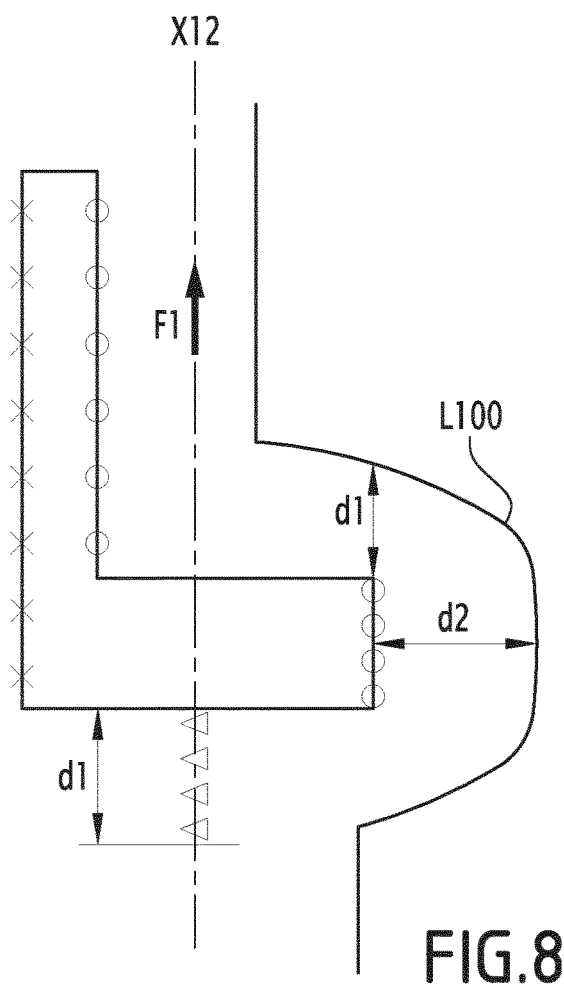
FIG. 8 represents the path of a sprayer of the installation represented in FIG. 1 along the spraying axis thereof, in relation to a set of measurement points belonging to a component piece.

The positioning points for the sprayer are generated in the form of a semi-ellipse for each point of the tracking line. In other words, a displacement curve in the shape of a semi-ellipse is assigned to each point of the tracking lines. This gives, for each tracking line, a point cloud, which is not shown in FIG. 8 for the purposes of clarity of diagram. This point cloud is contained in a horizontal plane that passes through the axis of the sprayer. The ideal trajectory of the sprayer in order to maintain a correct application distance during the movement of the conveyor on the component piece corresponds to a surface line L100 of this point cloud. This envelope-surface line L100 passes through the point of each ellipse which is farthest from the axis of the conveyor X12. In FIG. 8, the distance d1 corresponds to the width, measured parallelly to the axis X12, the field of application of the sprayer and the distance d2 corresponds to the application distance desired for the sprayer. The set point trajectory L100 is an ideal trajectory for the sprayer, which is established for each sprayer based on the points of the corresponding tracking line, in a manner so as to automatically and independently adjust the application distance of each sprayer based on the exterior profile of the component piece.

Furthermore, each sprayer is controlled independently in order to spray the coating product only if the component piece is found to be in its field of application, or in its spraying field/range. This is carried out automatically by the ECU 100 by locating each component piece on the conveyor 12. More precisely, the measurements made by the sensors 8 and 10 also are to be used to locate each component piece along the axis X12 of the conveyor 12. In knowing the speed of the conveyor 12, it is possible to predict precisely when a component piece to be coated will arrive in front of each sprayer. The ECU 100 is therefore also capable of selectively interrupting the spraying of each sprayer. This makes it possible to avoid spraying the product unnecessarily.

Figure 9:
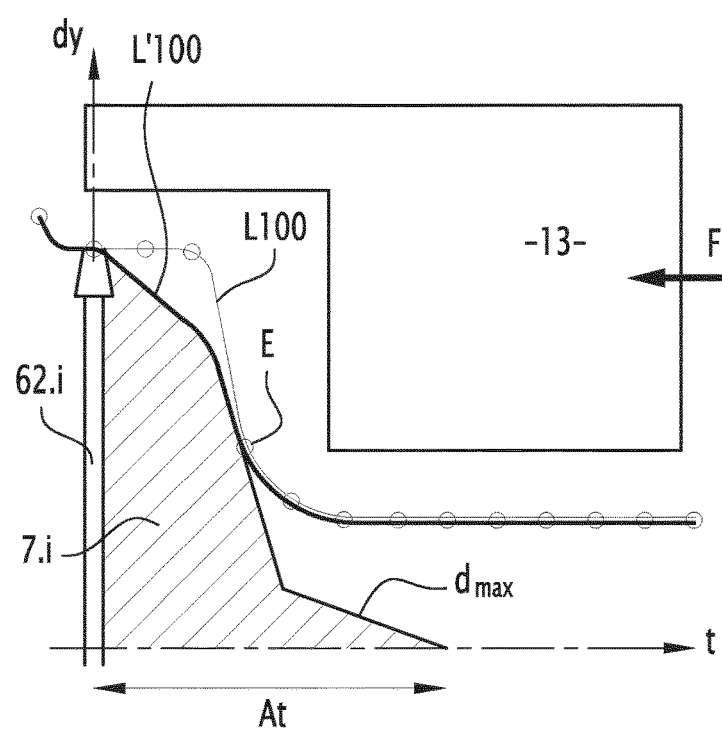
FIG. 9 is a diagram representing a modification of the trajectory of a sprayer of the installation represented in FIG. 1 for anticipating a collision with a component piece to be coated.

The set point trajectory L100 cannot always be followed, due to the constraints relating to each sprayer moving back. Each sprayer indeed is not able to move back as quickly as possible. The maximum displacement curve dmax of a right sprayer of the installation 1 as a function of time t is represented with a fine line in FIG. 9, which represents a graph that has for abscissa (x axis) the time scale t and for ordinate (y axis) the movement dy of a sprayer along its axis, that is to say along an axis that is parallel to the axis Y12. In this graph, the curve represented in a fine line passing through the circles corresponds to the trajectory established on the basis of the tracking line for the sprayer considered, this trajectory, having real and fictitious measurement points. The points that are situated below the curve dmax correspond to the positions that the sprayer is unable to attain in the time available. A zone Zi that is situated below the curve dmax and which is hatched in FIG. 9 is an "inaccessible" area for the sprayer.

The method therefore includes a step consisting of: checking to verify whether each sprayer is capable of following its trajectory L100, in particular in order to avoid a collision. For this, the method provides for calculating the time necessary for each sprayer to reach its position of "safety". This safety position corresponds to a maximum withdrawal position in which the sprayer is found to be on the exterior of the cell 2, or at the very least the farthest possible distance away from the axis of the conveyor X12. There is thus no risk of collision with the component pieces conveyed. The method also provides for calculating the distance At that is travelled by the one or more component pieces conveyed during this time of withdrawal. In this way it is possible to detect, by monitoring the one or more component pieces over the distance At which precedes each sprayer, whether a component piece is arriving too fast with respect to the displacement capacities of the sprayer and risks coming into collision with the latter.

If the geometry of the component piece to be coated is such that the envelope L100, that is to say, the ideal trajectory to be followed for the sprayer, passes through the restricted zone Zi, the sprayer moves itself to safety, that is to say that it moves back to the maximum so as to avoid a collision with the object suspended from the conveyor 12. In practice, this moving back is effected in advance of the passage of the component piece.

However, if the envelope L100 does not pass through the restricted zone Zi, but simply by one or more points of the maximum displacement curve dmax, it is possible to adapt the trajectory of the sprayer so as to avoid a collision, without however moving itself to safety and continue spraying. This new trajectory is represented by a bold line in FIG. 9. It is denoted with the reference L'100. More precisely, considering a point of intersection E between the maximum displacement curve dmax and the envelope L100, the modified trajectory L'100 first follows along the maximum displacement curve dmax and then resumes the trajectory L100 once the point E has been reached.

Thus, the sprayer does not collide with the component piece and maintains a correct application distance at least over the second part of the trajectory, that is to say, over the part starting at the critical point E. In other words, the trajectory L'100 most appropriately follows the ideal tracking line L100.

Figure 10:
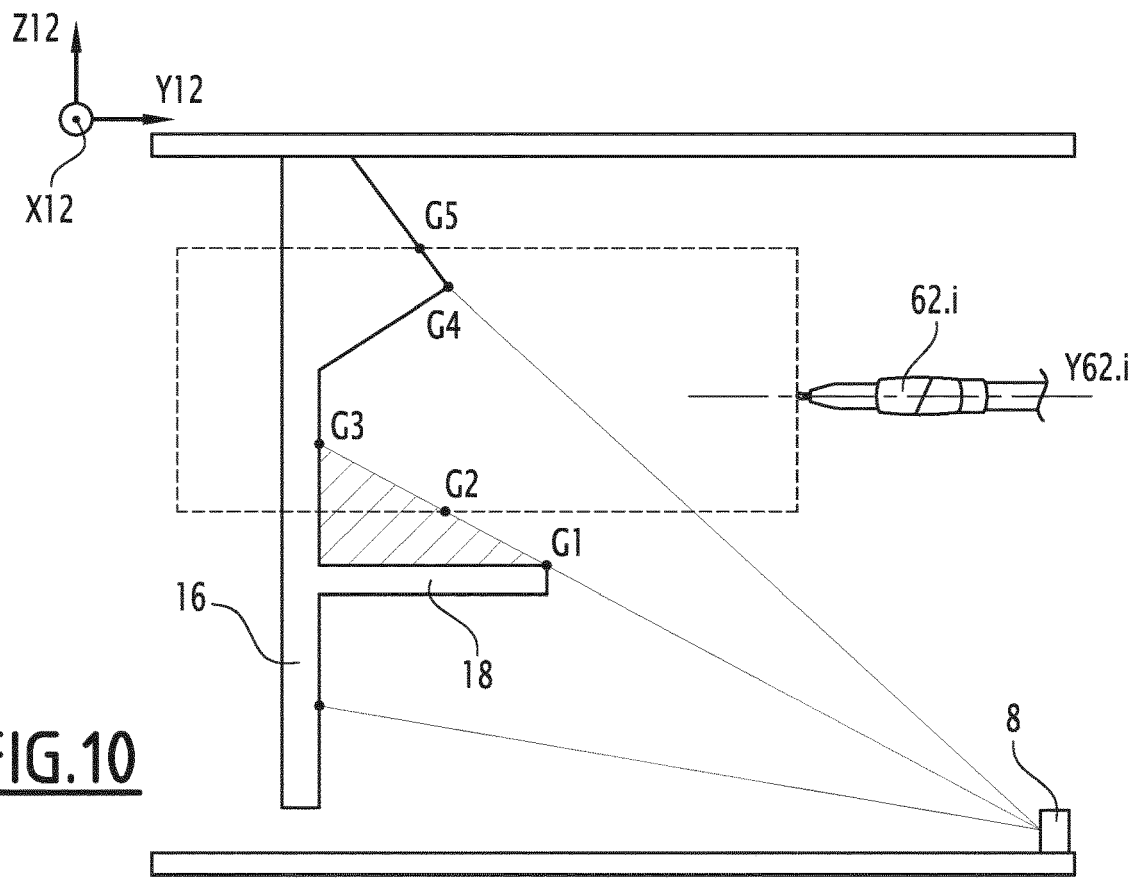
FIG. 10 is a diagram representing the treatment of shaded areas in the detection of dimensions of a component piece.

In the example of the component piece 16 illustrated in FIG. 10, the latter has a shape such that certain areas of the component piece cannot be accessed by the laser beam of the sensor 8 or 10. These areas are commonly referred to as shaded areas. Here, it is a shelf 18 which masks a certain portion of the component piece 16, the masked volume being hatched in FIG. 10. In this case, the exterior profile line is supplemented artificially by drawing a straight line segment between the successive points for which the sensor is capable of measuring the distance. These points therefore correspond to the points G1 and G3 in FIG. 10. To determine the points of the exterior profile line that are assigned to a sprayer 42.$i$, where i is comprised between 2 and 7, it is necessary to effect the intersection between the straight line segment drawn artificially between the points G1 and G3 and the lower bound of the field of application of the sprayer 42.$i$, which is represented by a rectangle in broken line in FIG. 10. The intersection between these two lines gives the point G2. G2 can therefore be considered as an "artificial" measurement point. G4 and G5 denote two points of the exterior profile line. G5 is located at the intersection of the exterior profile line with the upper bound of the field of application of the sprayer 42.1. The section of the exterior profile line which is assigned to the sprayer 42.$i$ thus extends between the points G2 and G5. The same operation can be performed to determine an artificial measurement point on the upper bound of the spraying field of the sprayer considered.

Figure 11:
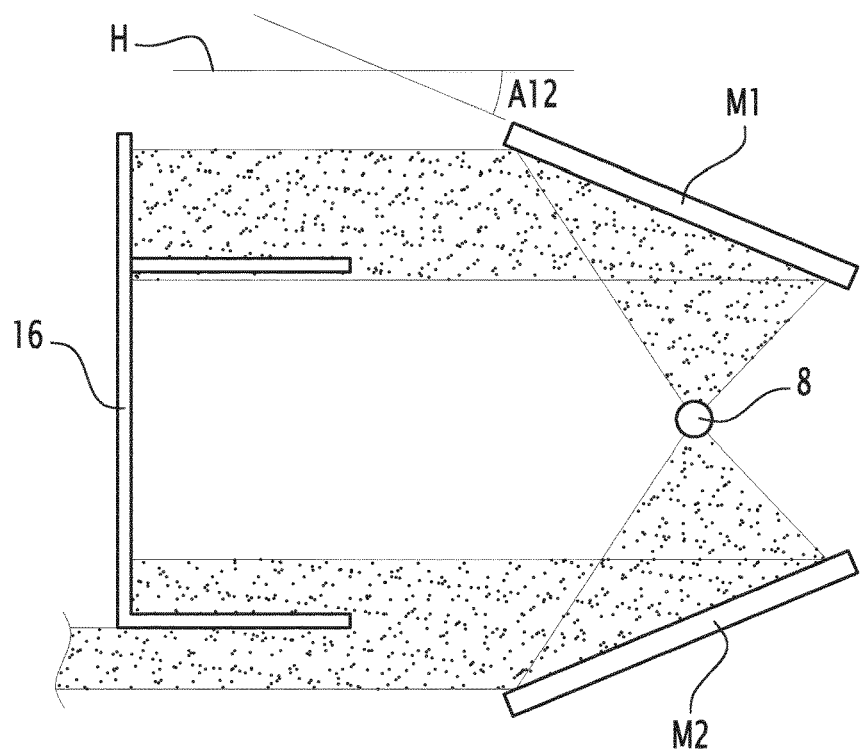
FIG. 11 represents a second embodiment of a coating application installation for applying a coating product, in which two mirrors are arranged, respectively above and below each laser sensor belonging to the installation.

In order to overcome the complex treatment of the shaded areas, it is possible to use, as represented in FIG. 11, two mirrors M1 and M2 disposed respectively above and below the laser sensor 8 and/or 10 so as to reflect a part of the rays originating from the one or more sensors in order to reach any possible shaded areas of a component piece 16 having a particular geometry. The sensors 8 and 10 are in fact capable of emitting a laser beam over an angular sector equal to 270° in a vertical plane. The mirrors M1 and M2 are slightly inclined relative to a horizontal plane H. More precisely, each mirror M1 or M2 is inclined relative to the plane H, at an angle A12 comprised between 20° and 70°, preferably equal to 45°. In addition, the mirrors M1 and M2 are inclined, relative to the plane H, in a manner such that they are opposite to each other, that is to say that they are oriented respectively to be facing upward and downward in the direction of the component piece to be coated 16. The mirrors M1 and M2 are thus oriented so as to reflect the rays of the laser sensor in the direction towards the shaded areas. By knowing the distance between the sensor 10 and the mirrors M1 and M2 and the angle of inclination of the mirrors, it is possible to deduce therefrom the distance, measured parallelly to the axis Y12, between each point of the exterior profile line and the sensor 10. This arrangement of mirrors thus makes it possible to eliminate the process for treating of shaded areas described here above.

By way of a variant that is not represented, another type of sensor may be used as an ultrasonic sensor or an optical sensor, such as a camera.

According to another variant that is not represented, at least one of the sprayers is capable of performing a combined vertical and horizontal movement in its displacement plane, which is the plane that is orthogonal to the axis X12 of displacement of the conveyor 12. For example, each sprayer of this type can be mounted on the end of the arm of a multi-axis robot, in particular a six-axis robot or on a reciprocator type robot, that performs movements back and forth in the height-wise direction. In this latter case, the sprayer remains mounted on a carriage that is movable horizontally in translational motion. If the robot is capable of coating the entire component piece, the exterior profile line is not truncated and all the points of the exterior profile line belong to the field of application of the sprayer. The multi-axis robots each include an articulated arm and perform movements back and forth in the height-wise direction and also follow a trajectory in the depth-wise direction, that is to say parallel to the axis Y12.

These robots have a movement speed that is far higher than that of the conveyor 12, for example of the order of 1 m/s, while the speed of the conveyor 12 is for example 1 m/min. The point that is nearest to the sprayer in its field of application is constantly updated all along the vertical displacement of the sprayer by the robot and the movement forward of the component piece on the conveyor. The application distance of the sprayer is automatically adjusted based on the coordinates of the nearest point. In this case, the tracking line corresponds to a line corresponding to the back and forth travel in the height-wise direction. Furthermore, the set point trajectory of the sprayers capable of performing a combined horizontal and vertical movement is calculated in the following manner. An exterior profile surface formed by all of the exterior profile lines is defined. This surface is extended digitally by fictitious measurement points on both sides in the length-wise direction. Then, a displacement curve in the shape of a semi-ellipse is assigned to each real measurement point belonging to exterior profile lines and to each fictitious measurement point, the nominal application distance of the sprayer corresponding to half the major axis of the displacement curve. Then a peripheral envelope surface of the point cloud formed by the points of each displacement curve assigned is determined. The points of the cloud are distributed in three dimensions, that is why the peripheral envelope surface is also referred to as "3D mapping". The set point trajectory is established within the interior of this envelope surface.

According to another variant that is not represented, the sprayer columns are not vertical but slightly inclined relative to the vertical axis Z12.

According to another variant that is not represented, the measurement planes of the sensors 8 and 10 are perpendicular to the axis of movement X12 of the conveyor 12, that is to say that the angles A8 and A10 are zero.

According to another variant that is not represented, the conveyor is a floor-based conveyor on which the component pieces to be coated are placed.

According to another variant that is not represented, the installation 1 comprises at least one bent sprayer, which is mounted at the end of a robot arm and which is intended for coating with the product the upper surface of the component pieces conveyed. The spraying axis is therefore not parallel to the axis of movement of the sprayer. This sprayer is capable of performing a combined horizontal and vertical movement in its displacement plane, which is orthogonal to the axis of movement X12 of the conveyor 12. The application distance of the sprayer is also automatically adjusted based on the coordinates of the nearest point in its spraying field, thanks to the method detailed here above.

According to another variant that is not represented, the displacement plane of one or more sprayers is not perpendicular to the axis of the conveyor X12, but oblique relative to this axis. The displacement plane is therefore in this case a vertical plane that forms with the axis X12 an angle, which is preferably comprised between 45° and 135°. This in particular makes it possible to more effectively paint the surfaces disposed at the longitudinal ends of the component pieces conveyed, that is to say, the front and rear surfaces that are perpendicular to the axis of the conveyor X12.

The technical characteristics of the variants and embodiments envisaged here above may be combined with each other so as to generate new embodiments of the invention.

The invention claimed is:

1. A coating application method for applying a coating product on a component piece moved by a conveyor, along which is arranged at least one sprayer that is movable in a plane that is oblique or perpendicular to an axis of movement of the conveyor, this method comprising the automated steps of:
   a) determining in a fixed coordinate system, the coordinates of the points of one or more external profile lines of the component piece distributed over the length of the component piece;
   b) assigning to each sprayer the points of each exterior profile line that are found to be in a spraying field of the respective sprayer;
   c) among the points assigned to each sprayer, identifying for each exterior profile line the point that is nearest to the sprayer;
   d) determining for each sprayer, a tracking line that passes through the orthogonal projection of all the nearest points identified in the step c) in a plane passing through an axis of the sprayer and parallel to the axis of movement of the conveyor; and
   e) establishing a set point trajectory for each sprayer on the basis of the points of the tracking line in a manner so as to adjust automatically and independently the application distance of each sprayer according to the exterior profile of the component piece.

2. The method according to claim 1, further comprises a step of measuring the position of each component piece along the conveyor, and wherein step a) further comprises determining the coordinates of the points of a plurality of exterior profile lines distributed at regular intervals over the length of the component piece.

3. The method according to claim 2, further comprises a step of controlling each sprayer in order for spraying the coating product only if the component piece is found to be in the spraying field of the sprayer.

4. The method according to claim 1, wherein each tracking line is extended digitally on either side by fictitious measurement points for spraying the coating product on a front surface and a rear surface of the component piece.

5. The method according to claim 4, wherein the fictitious measurement points are positioned on the axis of movement if the front surface or rear surface is intersected by the axis of movement and are positioned axially in line with the first point or with the last point of the tracking line if the front or rear surface is not intersected by the axis of movement.

6. The method according to claim 5, wherein the fictitious measurement points are distributed over a segment that is parallel to the axis of movement, whose length is equal to the width of the spraying field of the sprayer.

7. The method according to claim 4, wherein the step e) further comprises:
assigning a displacement curve in the shape of a semi-ellipse to each point of the tracking lines, the nominal application distance of the sprayer corresponding to half the major axis of the displacement curve; and
determining the set point trajectory by establishing an envelope-surface line of a point cloud formed by the points of each assigned displacement curve.

8. The method according to claim 1, wherein at least one of the sprayers is capable of performing a combined vertical and horizontal movement in a displacement plane of the sprayer, wherein the point that is nearest to the sprayer within a field of application of the sprayer is updated over the course of the vertical movement of the sprayer and wherein the application distance of the sprayer is automatically adjusted based on the coordinates of the nearest point.

9. The method according to claim 8, further comprises a calculation step for calculating the trajectory of the sprayers that are capable of performing a combined movement, the calculation step comprises:
digitally extending an exterior profile surface, formed by all the exterior profile lines, by fictitious measurement points on both sides in the lengthwise direction;
assigning a displacement curve in the shape of a semi-ellipse to each real measurement point belonging to the exterior profile lines and to each fictitious measurement point, a nominal application distance of the sprayer corresponding to half the major axis of the displacement curve;
determining a peripheral envelope surface of the point cloud formed by the points of each assigned displacement curve; and
establishing a set point trajectory within the interior of this peripheral envelope surface.

10. The method according to claim 1, further comprises: checking to verify whether each sprayer is capable of following a trajectory of the respective sprayer; and if the sprayer is not capable thereof, establishing a new trajectory, which best follows the set point trajectory, or moving back to the maximum extent of the sprayer in order to avoid a collision between the component piece to be coated and the sprayer.

\* \* \* \* \*